United States Patent [19]
Satran et al.

[11] Patent Number: 6,053,672
[45] Date of Patent: *Apr. 25, 2000

[54] MILLING CUTTING INSERT AND MILLING TOOLHOLDER THEREFOR

[75] Inventors: Amir Satran, Kfar Vradim; Rafael Margulis, Karmiel, both of Israel

[73] Assignee: Iscar Ltd., Midgal Tefen, Israel

[*] Notice: This patent is subject to a terminal disclaimer.

[21] Appl. No.: 09/043,210

[22] PCT Filed: Sep. 17, 1996

[86] PCT No.: PCT/IL96/00111

§ 371 Date: Mar. 13, 1998

§ 102(e) Date: Mar. 13, 1998

[87] PCT Pub. No.: WO97/10915

PCT Pub. Date: Mar. 27, 1997

[30] Foreign Application Priority Data

Sep. 18, 1995 [IL] Israel ........................................ 115338

[51] Int. Cl.[7] ........................................................ B23C 5/20
[52] U.S. Cl. .................. 407/40; 407/47; 407/53; 407/56; 407/113
[58] Field of Search .................. 407/30, 40, 33, 407/35, 46, 47, 48, 50, 51, 53, 60, 61, 62, 113, 114, 116, 11

[56] References Cited

U.S. PATENT DOCUMENTS

| | | | |
|---|---|---|---|
| 1,174,460 | 3/1916 | Wirz | 407/35 X |
| 2,805,469 | 9/1957 | Greenleaf . | |
| 3,104,453 | 9/1963 | Greenleaf . | |
| 4,425,063 | 1/1984 | Striegl | 407/113 X |
| 4,522,538 | 6/1985 | Lindsay | 407/35 |
| 4,632,607 | 12/1986 | Pantzar . | |
| 4,648,760 | 3/1987 | Karlsson et al. | 407/113 X |
| 4,790,693 | 12/1988 | Koblesky | 407/35 |
| 4,930,945 | 6/1990 | Arai et al. . | |
| 4,934,880 | 6/1990 | Stashko | 407/43 |
| 4,979,853 | 12/1990 | Field | 407/11 X |
| 4,995,767 | 2/1991 | Segal | 407/34 X |
| 5,007,775 | 4/1991 | Pantzar . | |
| 5,207,538 | 5/1993 | Satran . | |
| 5,209,611 | 5/1993 | Drescher | 407/33 X |
| 5,382,118 | 1/1995 | Satran et al. | 407/42 |
| 5,443,334 | 8/1995 | Pantzar | 407/113 |
| 5,685,670 | 11/1997 | Satran | 407/42 |
| 5,727,910 | 3/1998 | Leeb | 407/34 |
| 5,791,832 | 8/1998 | Yamayose | 407/113 |
| 5,800,100 | 9/1998 | Krenzer | 407/113 X |

FOREIGN PATENT DOCUMENTS

| | | |
|---|---|---|
| 0 342 689 | 11/1989 | European Pat. Off. . |
| 0 358 623 | 3/1990 | European Pat. Off. . |
| 0 156 780 | 10/1995 | European Pat. Off. . |
| 17 52 220 | 5/1971 | Germany . |
| 3633 320 A1 | 6/1987 | Germany . |
| 92 00 612 U | 3/1992 | Germany . |
| 92 00 612 U | 4/1992 | Germany . |
| 004201112 | 7/1993 | Germany ............................. 407/113 |
| WO 95 22425 | 8/1995 | WIPO . |

*Primary Examiner*—Henry W. H. Tsai
*Attorney, Agent, or Firm*—Pennie & Edmonds

[57] ABSTRACT

A milling cutting insert including a substantially prismatic body portion having an upper surface, a lower surface and at least two pairs of adjacent side surfaces; a pair of spaced apart co-planar abutment surfaces formed along a first side of a first of the pairs of side surfaces and at least one planar abutment surface formed along a second side of the first pair of side surfaces; and a cutting corner defined between the side surfaces of a second pair of side surfaces and including a front cutting edge protruding outwardly with respect to a first side of the other pair of side surfaces opposite the first side of the first pair of side surfaces, the front cutting edge being parallel to the spaced apart co-planar abutment surfaces.

13 Claims, 15 Drawing Sheets

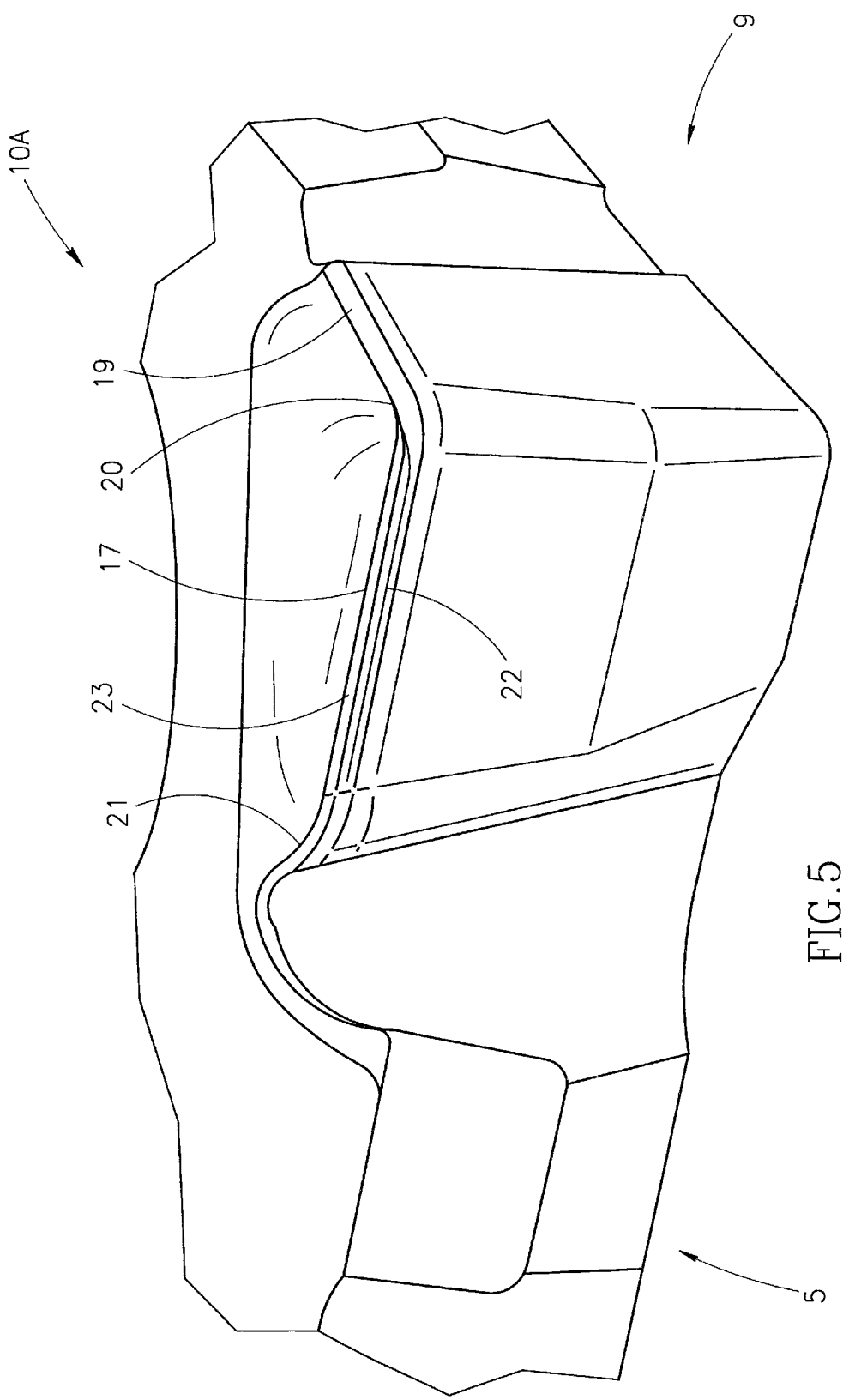

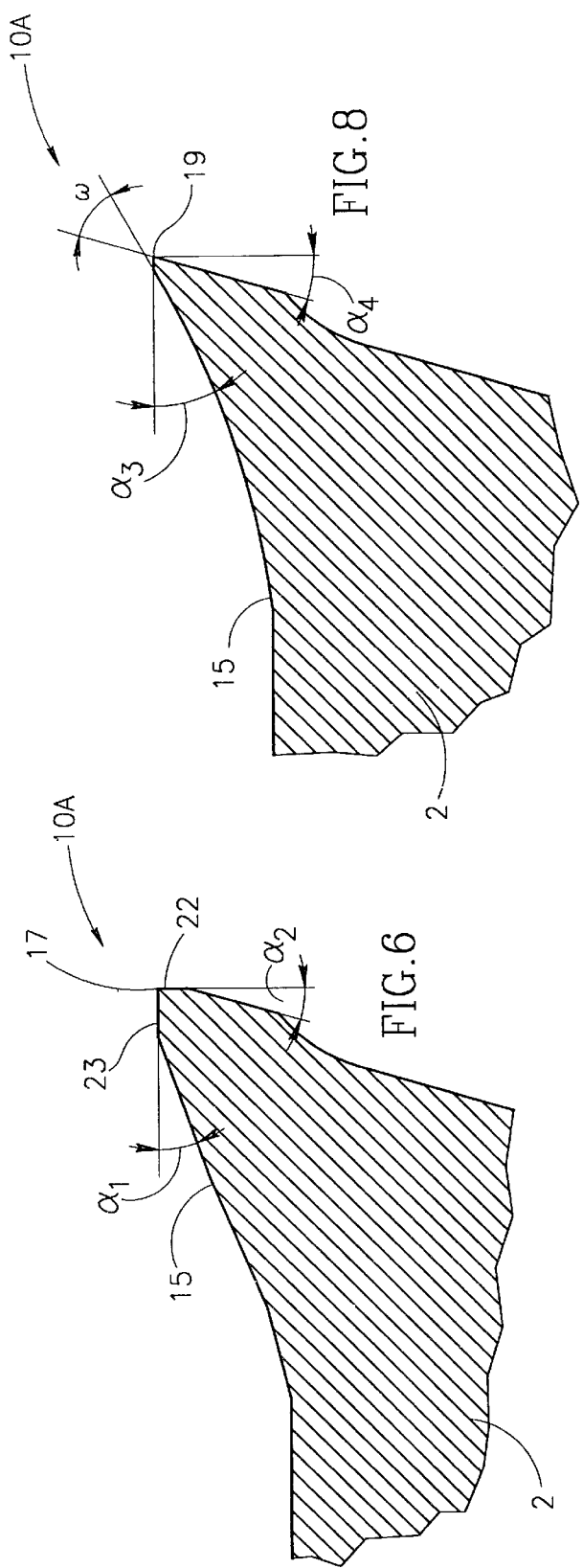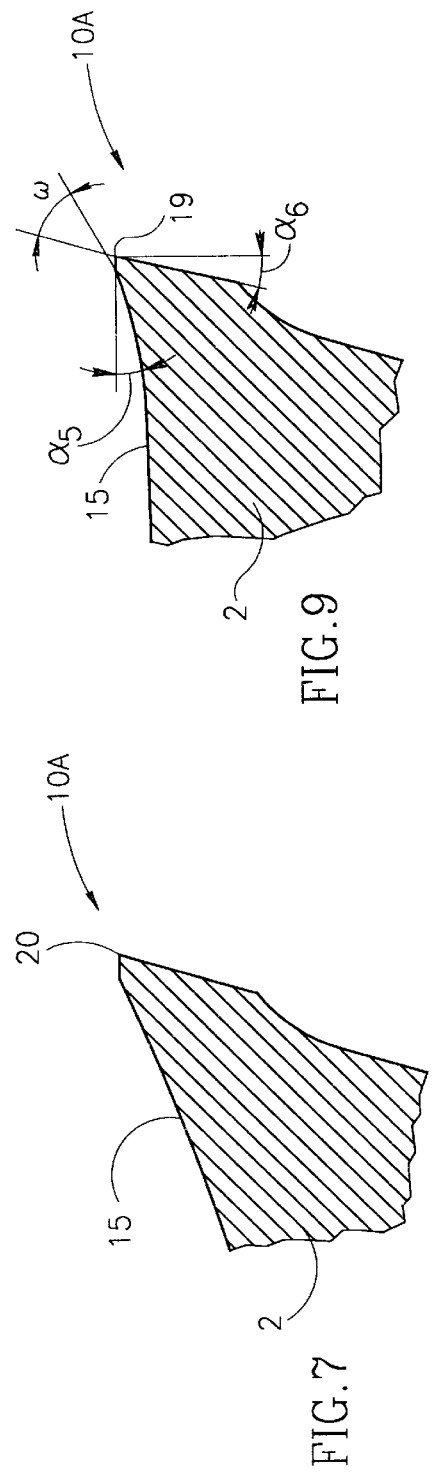

MILLING CUTTING INSERT AND MILLING TOOLHOLDER THEREFOR

FIELD OF THE INVENTION

The present invention relates to milling cutting inserts and a milling toolholder for use therewith for performing end face milling operations.

BACKGROUND OF THE INVENTION

A light metal workpiece is typically provided in a near net shape which preferably requires a single minimal depth-of-cut chip removing cum finishing operation to arrive at its desired highly smooth final net shape. For the purpose of machining a workpiece to a highly smooth finish, a milling cutter requires minimal runout in general and minimal axial runout in particular attained 'by its cutting inserts being mounted such that their operative front cutting edges lie on a single plane, namely, the workpiece's face plane.

A milling cutting insert of parallelipipedal shape as described in the Applicant's U.S. Pat. No. 5,207,538 to Satran can be disposed in one of two dispositions in both of which it is axially inclined so as to provide suitable axial rake and relief angles. In a first disposition, the insert is respectively axially and radially supported by a single support surface and two spaced apart support surfaces provided by the side walls of an insert receiving pocket such that a long main cutting edge serves as a side cutting edge and a dedicated front cutting edge of a protruding nose-like cutting corner serves as a wiper to wipe a face plane of a workpiece. In a second disposition, the insert is respectively axially and radially supported by two spaced apart support surfaces and a single support surface provided by the side walls of an insert receiving pocket such that an extension of its long main cutting edge is angularly disposed to serve as a wiper to wipe a face plane of a workpiece. In both modes, due to the tolerances in its insert receiving pockets, the milling cutter is unable to wipe a face plane to a highly smooth finish and consequently such a finish is typically achieved by a subsequent grinding operation.

As described in U.S. Pat. No. 2,805,469, it is known to provide axially inclined insert receiving pockets in a two-piece milling toolholder constituted by a main body on which an annular flange ring, is adapted to be nested on from the rear such that the main body provides the pockets' base support surfaces and radial support surfaces for respectively taking up tangential thrust and radial thrust and the annular flange ring provides the pockets' axial support surfaces for taking up axial thrust. Notwithstanding the detrimental affect on axial runout due to the axial inclination of the base support surface, the annular flange ring requires radially extending notches such that inserts are not axially supported on along their upper side edges which further increases axial runout.

SUMMARY OF THE INVENTION

In accordance with a first aspect of the present invention, there is provided a milling cutting insert comprising:
  a substantially prismatic body portion having an upper surface, a lower surface and at least two pairs of adjacent side surfaces;
  a pair of spaced apart co-planar abutment surfaces formed along a first side of a first of said pairs of side surfaces and at least one planar abutment surface formed along a second side of said first pair of side surfaces; and
  a cutting corner defined between the side surfaces of a second pair of side surfaces and including a front cutting edge protruding outwardly with respect to a first side of the other pair of side surfaces opposite said first side of said first pair of side surfaces, said front cutting edge being parallel to said spaced apart co-planar abutment surfaces.

In a preferred embodiment-of the present invention, the insert is rectangularly shaped in a top view and is provided with two diagonally opposite indexable cutting corners. As such, each cutting corner further includes a side cutting edge transversely directed to its front cutting edge whilst each long side surface is formed with a pair of spaced apart co-planar abutment surfaces and each short side surface is formed with a single planar abutment surface.

One of the spaced apart abutment surfaces along a long side surface is preferably located opposite the front cutting edge of its opposing long side surface whilst the other abutment surface is adjacent the cutting corner along the same long side surface so as to be remote as possible from the former abutment surface. In addition, the abutment surface along a short side surface is preferably located opposite the side cutting edge of its opposing short side surface.

The co-planar abutment surfaces along the long side surfaces and the planar abutment surfaces along the short side surfaces are preferably disposed so as to be perpendicular to the lower surface so as to provide two diagonally opposite square box-like constructions each of which are dedicated for the positioning of an associated diagonally opposite cutting corner.

In a preferred embodiment of the cutting insert, the front cutting edge is elevated with respect to the insert's upper surface so as to provide the required positive axial rake and relief angles for high speed finishing operations on light metal workpieces without the need for axial inclination of the insert.

In accordance with a second aspect of the present invention, a milling cutter having an axis of rotation and comprising a milling toolholder for use with one or more cutting inserts each having a front cutting edge for acting as a wiper disposed on a radial plane perpendicular to the axis of rotation, the milling toolholder being formed with one or more insert receiving pockets each having a planar base support surface parallel to the axis of rotation for tangentially supporting an insert seated therein, an axial support surface for axially supporting said insert at at least two spaced apart contact regions defining a first imaginary line perpendicular to the axis of rotation in a top view of the milling cutter and a radial support surface for radially supporting said insert at a single contact region defining a second imaginary line perpendicular to said first imaginary line in said top view of the milling cutter.

Thus, in accordance with the teachings of the present invention, the minimal axial runout required for machining a face plane to a highly smooth finish is attained by the mounting of a cutting insert without an axial inclination, the cutting insert being axially supported by a pair of spaced apart contact regions and radially supported by a single contact region. For the purpose of minimal axial runout of the milling cutter, the pair of axially supporting contact regions is at the expense of only a single radially supporting contact region, however, such a single radially supporting contact region is sufficient to bear the relatively small radial thrust generated by the milling of a near net shape workpiece.

An insert receiving pocket's axial and radial support surfaces are preferably planar as are the corresponding support surfaces of an insert which are designed to be juxtapositioned thereagainst such that each of the contact regions is defined by the two planar surfaces bearing against one another. In addition, an insert receiving pocket's axial and radial support surfaces are preferably perpendicular to their associated base support surface.

In accordance with a third aspect of the present invention, there is provided a milling toolholder having an axis of rotation and comprising a main component member and a substantially annular flange ring for nesting on said main component member from the rear so as to form a plurality of insert receiving pockets each defined by a base support surface, radial support surface and an axial support surface characterized in that said annular flange ring includes a highly smooth lower surface perpendicular to the axis of rotation for providing said plurality of axial support surfaces.

Such a construction is preferable over a single body milling toolholder by virtue of the support surfaces being more readily workable to tight tolerances without the impediment of having to work within a confined space as the case of the latter construction.

BRIEF DESCRIPTION OF THE DRAWINGS

For a better understanding of the present invention and to show how the same can be carried out in practice, by way of non-limiting examples only, reference will now be made to the accompanying drawings, in which:

FIG. 5 is an isometric close-up view of a cutting corner of the cutting insert of FIG. 1;

FIG. 6. is a partial cross-sectional view taken along line VI—VI in FIG. 2;

FIG. 7. is a partial cross-sectional view taken along line VII—VII in FIG. 2;

FIG. 8. is a partial cross-sectional view taken along line VIII—VIII in FIG. 2;

FIG. 9. is a partial cross-sectional view taken along line IX—IX in FIG. 2;

DETAILED DESCRIPTION OF THE DRAWINGS

Figure 1:
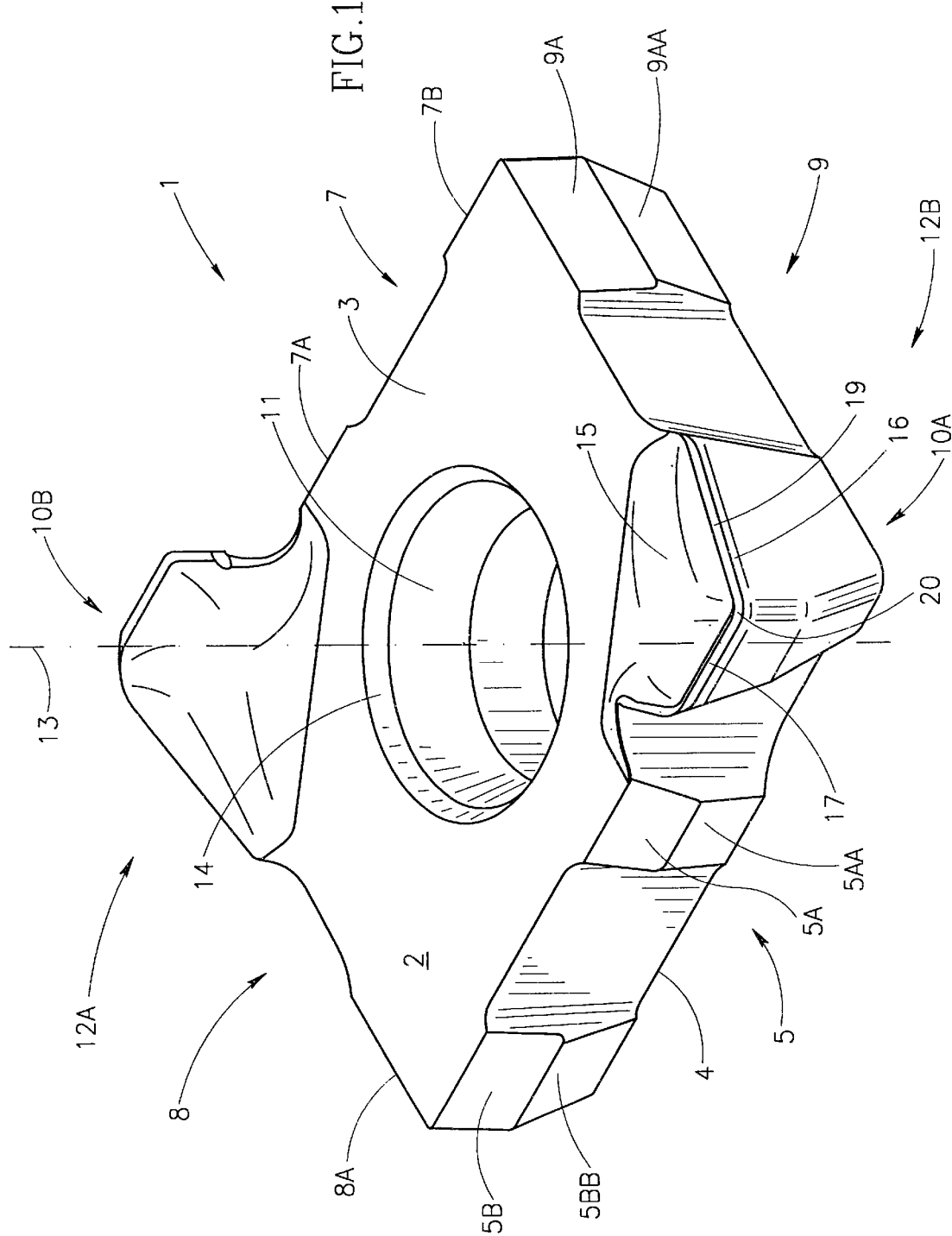
FIG. 1 is an isometric view of a rectangular shaped milling cutting insert in accordance with a preferred embodiment of the present invention.

FIGS. 1–4 show a milling cutting insert, generally designated 1, having a substantially prismatic body 2 of a substantially rectangular basic shape in a top view and having an upper surface 3, a lower surface 4, long side surfaces 5 and 7 and short side surfaces 8 and 9. The long side surface 5 and the short side surface 9 meet at a cutting corner 10A whilst the long side surface 7 and the short side surface 8 meet at a cutting corner 10B diagonally opposite to the cutting corner 10A. As will be described in greater detail hereinbelow, the cutting insert 1 is provided with square box-like constructions 12A and 12B respectively diagonally opposite the cutting corners 10A and 10B for the accurate positioning of the cutting insert 1 relative to a milling toolholder's axis of rotation.

The cutting insert 1 has an axis of symmetry 13 about which it displays half-turn symmetry and, therefore, the details of its construction are described hereinbelow with reference to the cutting corner 10A and the box-like construction 12A, it being understood that the details equally apply to the cutting corner 10B and the box-like construction 12B. For retaining the cutting insert 1 to a milling toolholder, the insert body 2 is preferably provided with a cylindrical fixation hole 11 disposed such that its axis is coincident with the axis of symmetry 13 and having a countersink 14 preferably shaped as a part of a torus or a cone to receive a countersunk head screw or any other fixing element, such as a pinlock.

The cutting corner 10A has a compound chip cutting rake surface 15 which, on the one hand, merges with the upper surface 3 and, on the other hand, intersects with a wraparound relief flank 16 so as to form a front cutting edge 17 and a side cutting edge 19 transversely disposed thereto via a corner cutting edge 20. The wraparound relief flank 16 is constituted by planes which merge with adjacent portions of the side surfaces 5 and 9 meeting at the cutting corner 10A whilst the compound chip cutting rake surface 15 is constituted by blended surfaces containing planar portions.

Figure 2:
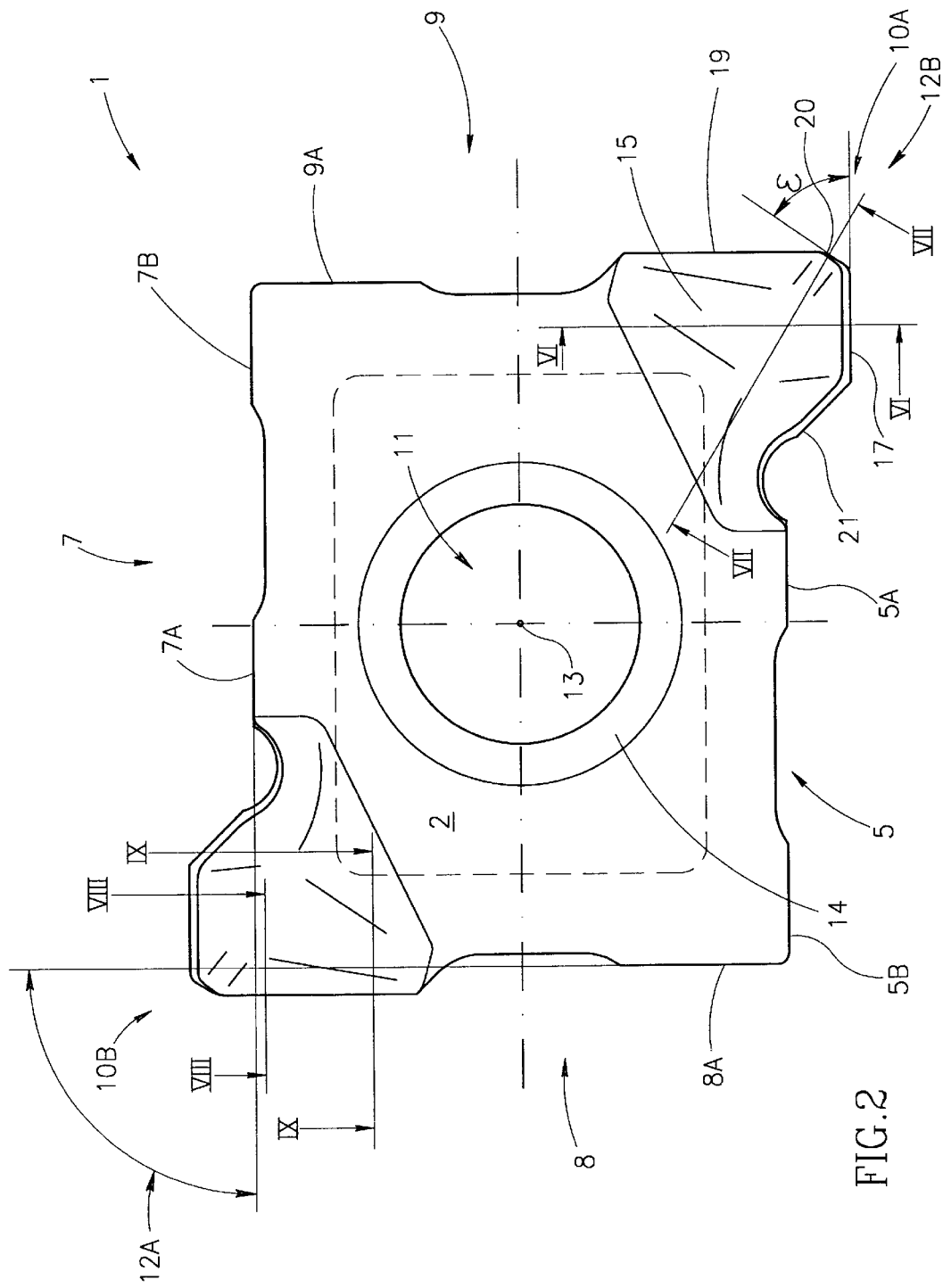
FIG. 2 is a top view of the cutting insert of FIG. 1.

As best seen in FIG. 2, the box-like construction 12A is constituted by a pair of spaced apart co-planar abutment surfaces 7A and 7B buttressed from below by chamfered portions (not shown) along the long side surface 7 and a planar abutment surface 8A similarly buttressed by a chamfered portion (not shown) along the short side surface 8. The abutment surfaces 7A, 7B and 8A are disposed so as to be perpendicular to the lower surface 4 such that the abutment surface 8A is also perpendicular to its associated abutment surfaces 7A and 7B. As shown, the abutment surface 7B is located opposite the front cutting edge 17 and the abutment surface 7A is located adjacent the cutting corner 10B so as to be remote as possible from the abutment surface 7B whilst the abutment surface 8A is located opposite the side cutting edge 19.

Figure 3:
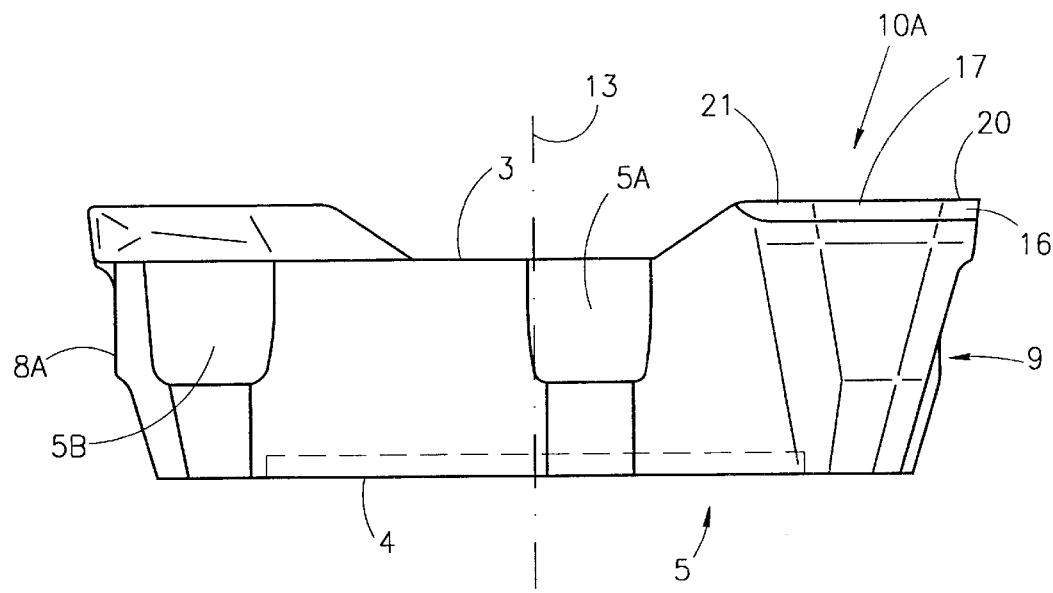
FIG. 3 is a front view of the cutting insert of FIG. 1.
Figure 4:
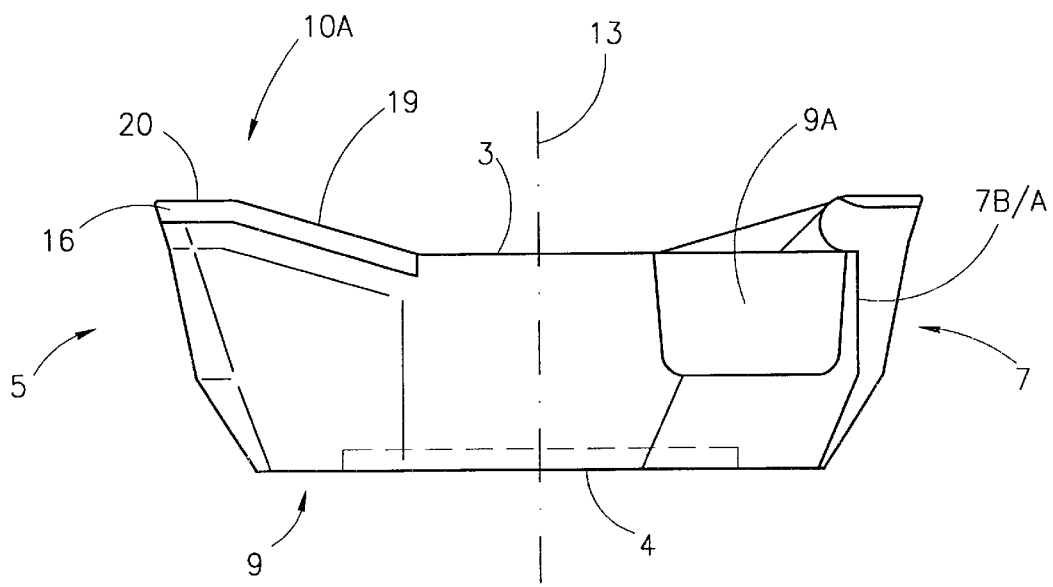
FIG. 4 is a side view of the cutting insert of FIG. 1.

As also best seen in FIG. 2, the front cutting edge 17 protrudes relative to the side surface 5 and is parallel to the co-planar abutment surfaces 7A and 7B for the purpose of its accurate placement in a face plane of a workpiece. In addition, as best seen in FIGS. 3 and 4, the front cutting edge 17 is also elevated relative to the upper surface 3 and parallel to the lower surface 4. Turning to the side cutting edge 19, as also best seen in FIG. 2, it protrudes relative to the side surface 9 whilst as best seen in FIG. 4, the side cutting edge 19 slopes towards the lower surface 4.

As seen in FIGS. 2 and 3, the front cutting edge 17 merges with the top edge of the long side surface 5 via an inner cutting edge 21 provided so as to enable the cutting insert 1 to be plungable into a workpiece up to a depth slightly less than the protrusion of the front cutting edge 17 relative to the long side surface 5. The front cutting edge 17 can be provided with a narrow ground land 22 (see FIGS. 5 and 6) co-extensive therewith for improving surface finishing whilst it can be strengthened by the provision of a rake land 23 having a substantially equal width therealong. A further advantage of the provision of the box-like construction 12A is that it facilitates the accurate grinding of the front cutting edge 17 and the narrow ground land 22, thereby improving their intended operation.

As best seen in FIGS. 6–9; the rake surface components of the rake surface 15 associated with the front, side and corner cutting edges 17, 19 and 20 are concave imparting, as shown in FIG. 6, suitable axial rake surface and relief flank surface angles $\alpha_1$ and $\alpha_2$ and, as shown in FIGS. 8 and 9, suitable radial rake surface angles $\alpha_3$, $\alpha_5$ and radial relief flank surface angles $\alpha_4$ and $\alpha_6$ adapted for the material to be worked. In particular, the protruding nature of the cutting corner 10A facilitates the provision of highly positive axial and radial rake and relief angles required for working soft materials such as aluminum. In addition, FIGS. 8 and 9 show that the cutting corner 10A is prepared such that it has a substantially invariant wedge angle ω along its side cutting edge 19.

Finally, as best seen in FIG. 2, the corner cutting edge 20 is preferably partly chamfered instead of being formed as a more usual nose radius so as to present an entrance angle ε of 60°, thereby preventing burring of a margin of a workpiece during a gradual leaving out therefrom. During finishing operations on a near net shape workpiece, the chamfered corner cutting edge 20 acts, in effect, as the side cutting edge of the cutting insert.

Figure 10:
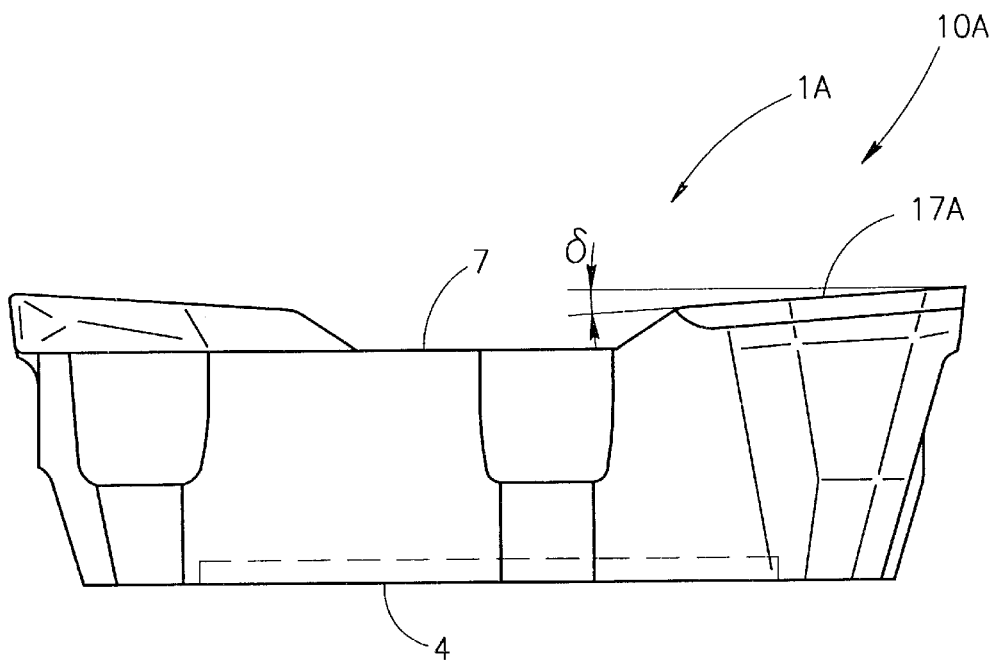
FIG. 10 is a front view of a second embodiment of a cutting insert having a front cutting edge inclined relative to its lower surface.
Figure 11:
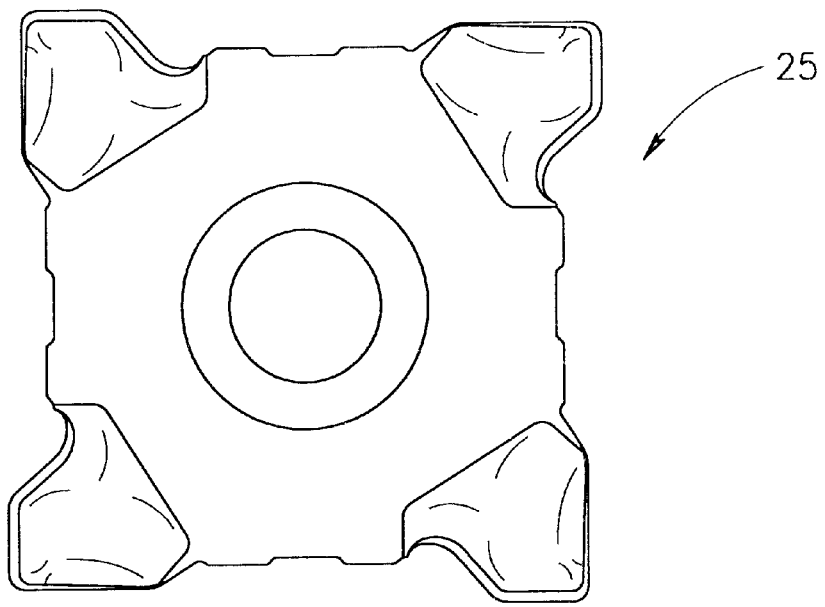
FIG. 11 is a top view of a square shaped cutting insert in accordance with the teachings of the present invention.
Figure 12:
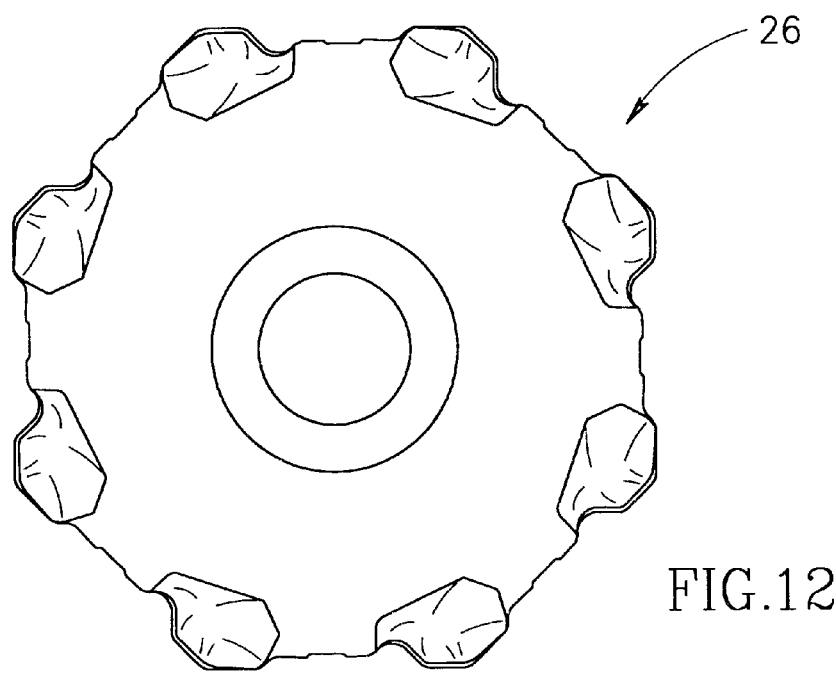
FIG. 12 is a top view of an octagonal shaped cutting insert in accordance with the teachings of the present invention.

Turning now briefly to FIG. 10–12, FIG. 10 shows that a cutting insert 1A can also be formed with its front cutting edge 17A inclined towards its lower surface 4 whilst FIGS. 11 and 12 respectively show equilateral inserts in a top view in the form of a square shaped cutting insert 25 having up to four cutting corners each supported by a corresponding box-like construction and an octagon shaped cutting insert 26 having up to eight cutting corners each supported by a corresponding box-like construction.

Figure 13:
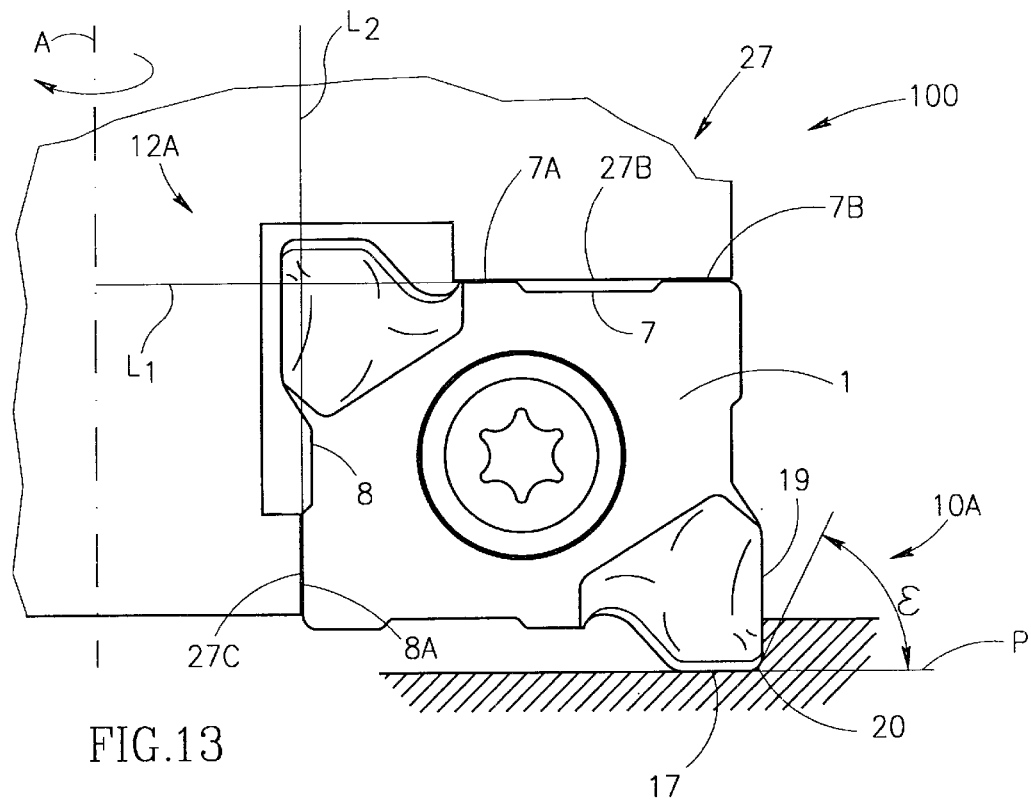
FIG. 13 is a schematic top view of the cutting insert of FIG. 1 seated in an insert receiving pocket of a right hand milling toolholder in accordance with the teachings of the present invention.
Figure 14:
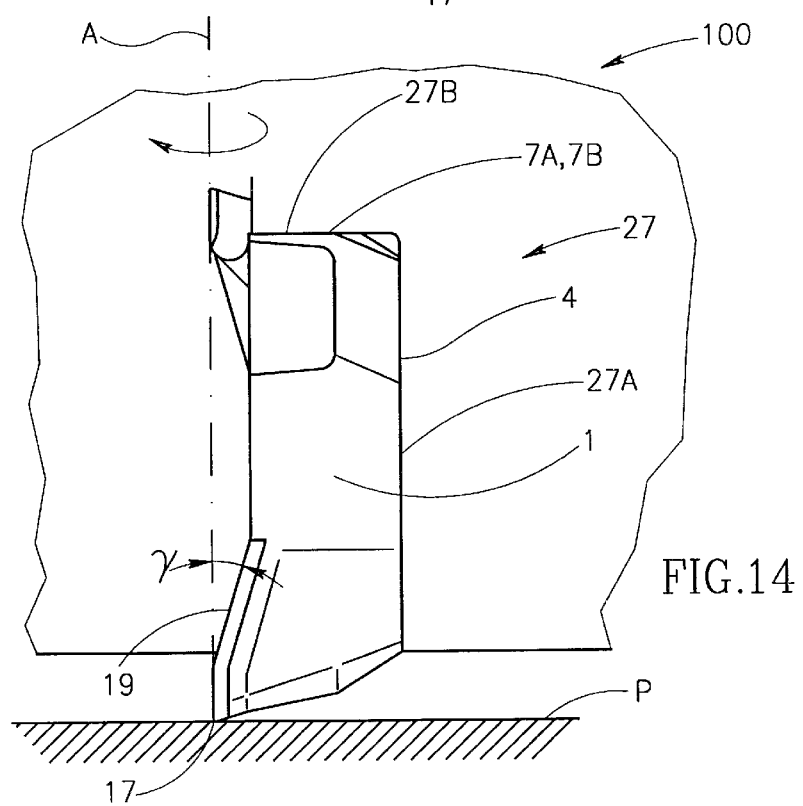
FIG. 14 is a schematic side view of the cutting insert of FIG. 1 seated in an insert receiving pocket of a right hand milling toolholder in accordance with the teachings of the present invention.
Figure 15:
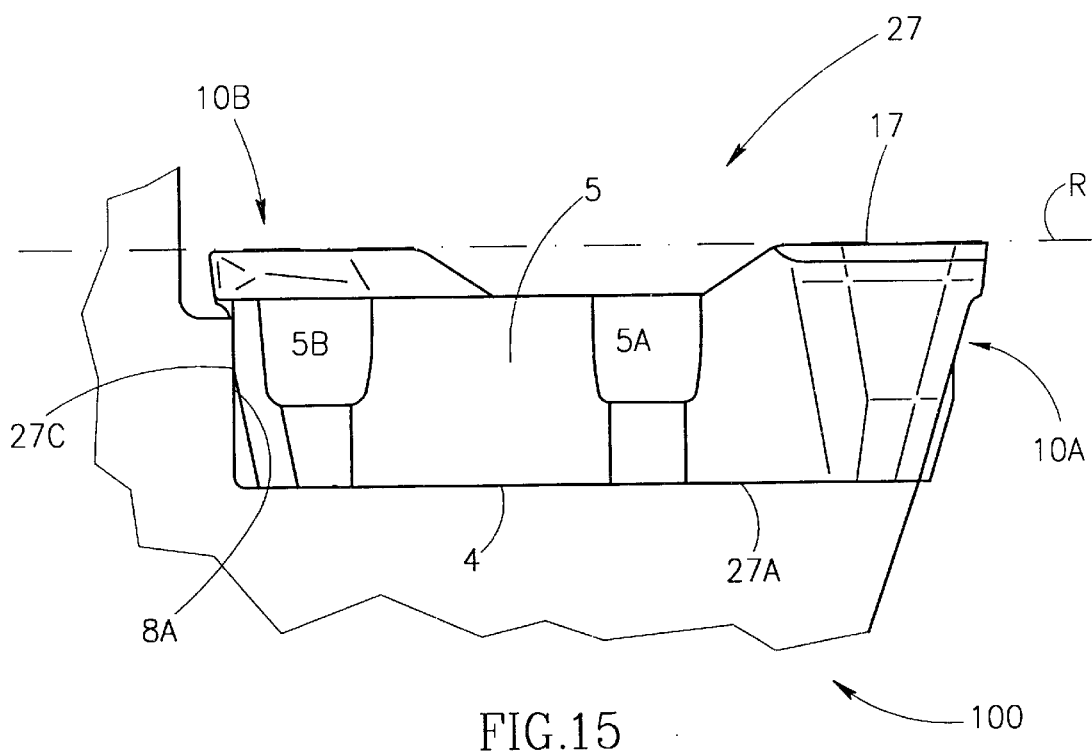
FIG. 15 is a schematic front view of the cutting insert of FIG. 1 seated in an insert receiving pocket of a right hand milling toolholder in accordance with the teachings of the present invention.

For the purpose of illustrating the mounting of a milling cutting insert 1 in an insert receiving pocket 27 adapted therefor of a milling toolholder 100 having an axis of rotation A, reference is now made to FIGS. 13–15 which show the use of its box-like construction 12A to position an operative cutting corner 10A having its front cutting edge 17 disposed on a radius R forming part of a radial plane P perpendicular to the axis of rotation A. As such, the insert receiving pocket 27 presents a planar base support surface 27A disposed parallel to the axis of rotation A and against which the lower surface 4 is adapted to bear for taking up tangential thrust. In addition, the insert receiving pocket 27 presents a radially deployed, planar axial support surface 27B which is perpendicular to both the axis of rotation A and the base support surface 27A and against which the pair of abutment surfaces 7A and 7B are designed to bear for taking up axial thrust at two spaced apart contact regions defining an imaginary line $L_1$ perpendicular to the axis of rotation A (see FIG. 13). And finally, the insert receiving pocket 27 presents an axially deployed, planar radial support surface 27C which is parallel to the axis of rotation A and perpendicular to the base support surface 27A and against which the abutment surface 8A is designed to bear for taking up radial thrust at a contact region defining an imaginary line $L_2$ perpendicular to the imaginary line $L_1$ (see FIG. 13).

Such positioning provides minimal axial runout of a milling cutter provided with two or more cutting inserts such that their operative front cutting edges 17, together with their associated narrow ground lands 22, can wipe out a produced plane of a workpiece to a highly smooth finish. In addition, such a cutter's operative front cutting edges 17 protrude beyond their associated exposed lower abutment surfaces 5A and 5B so as to ensure that the milling cutter is axially plungable into a workpiece a sufficient depth for machining a near net shape workpiece without abrasion of the abutment surfaces 5A and 5B by chips formed during a milling operation. At the same time, the operative side cutting edges 19 sufficiently protrude beyond their associated exposed abutment surface 9A such that transverse movement of the milling cutter during a milling operation is not restricted. Finally, notwithstanding that the cutting inserts 1 are not inclined, the operative cutting corners 10A present the required high positive axial and radial rake and relief angles so as to be facilitate chip formation and removal from a light material workpiece.

Figure 16:
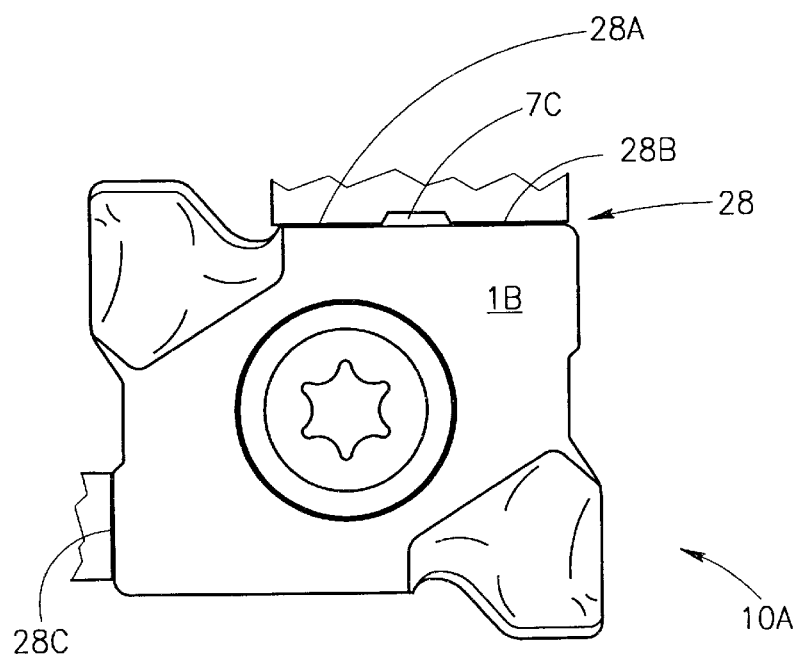
FIG. 16 is a top view of an insert receiving pocket having a pair of spaced apart axial support surfaces for providing axial support to a cutting insert.

For accurately positioning a cutting insert so as to achieve minimal axial runout of a milling cutter, FIG. 16 shows that an insert receiving pocket 28 can be provided with a pair of spaced apart co-planar axial support surfaces 28A and 28B against which a single planar abutment surface 7C along a long side surface of a milling cutting insert 1B is adapted to bear.

Figure 17:
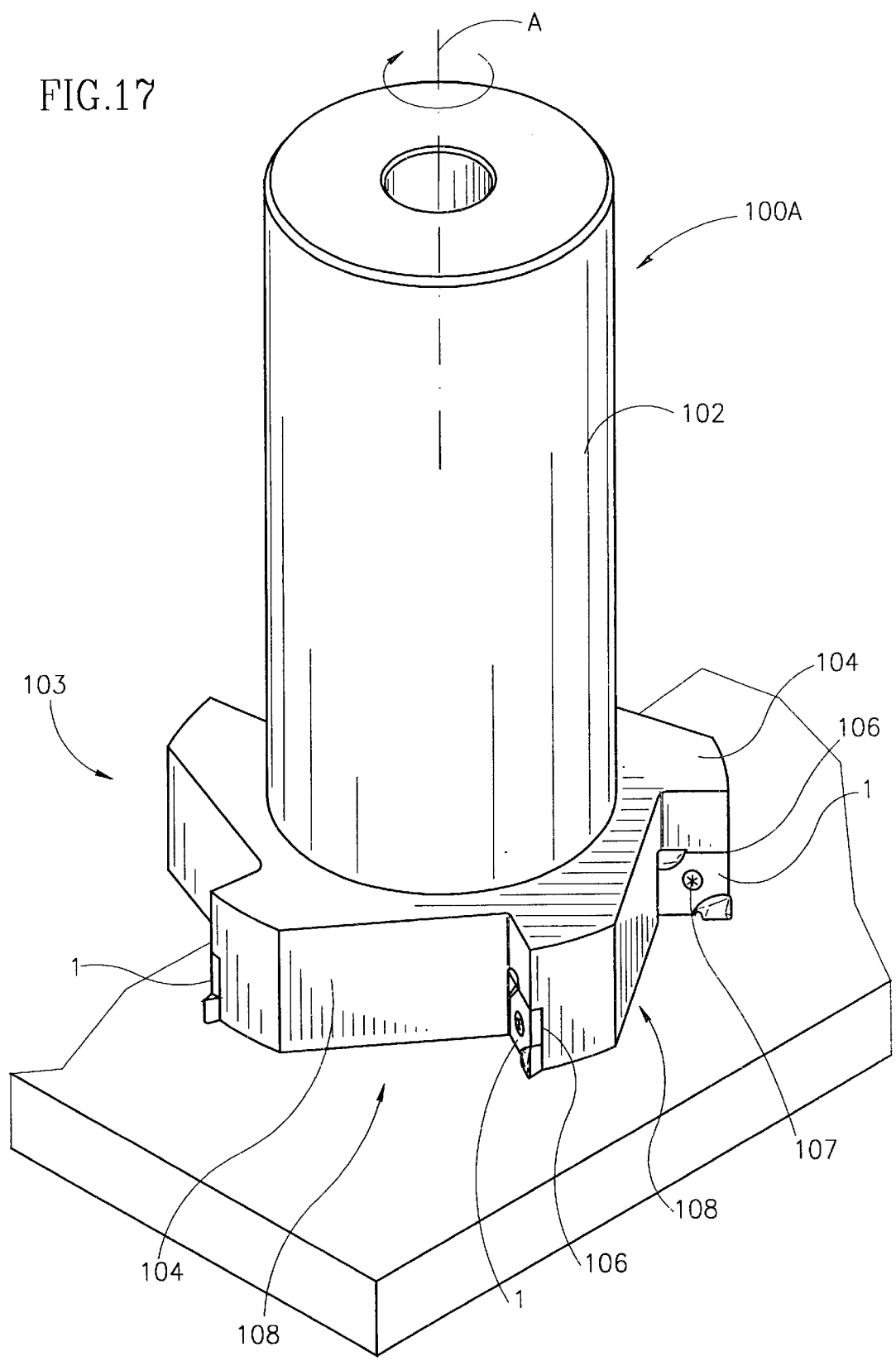
FIG. 17 is an isometric view of a single body milling cutter with cutting inserts of FIG. 1.

Turning now to FIG. 17, a single body milling toolholder, generally designated 100A, having a datum axis of rotation A and adapted to receive five cutting inserts 1, includes a conical shank portion 102 and a cutting head portion 103 having five seat structures 104 equiangularly spaced about its circumference. Each seat structure 104 is formed with an insert receiving pocket. 106 having support surfaces 27A, 27B and 27C for supporting a cutting insert 1 retained therein by means of a locking screw 107 and a cut-away gullet space 108 for enabling access to the cutting insert 1 seated therein and chip evacuation.

Figure 18:
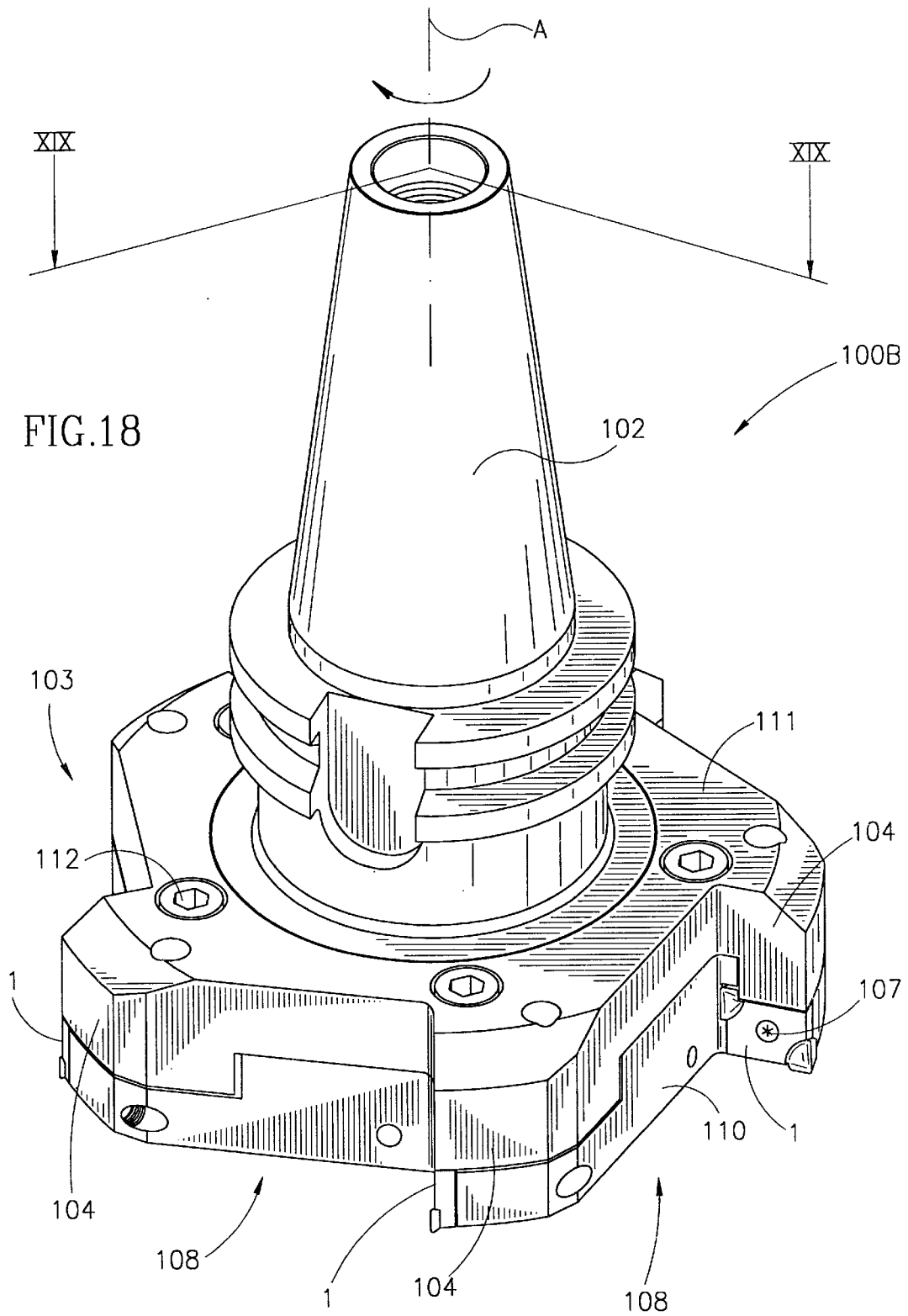
FIG. 18 is an isometric view of a two-piece milling cutter with cutting inserts of FIG. 1.
Figure 19:
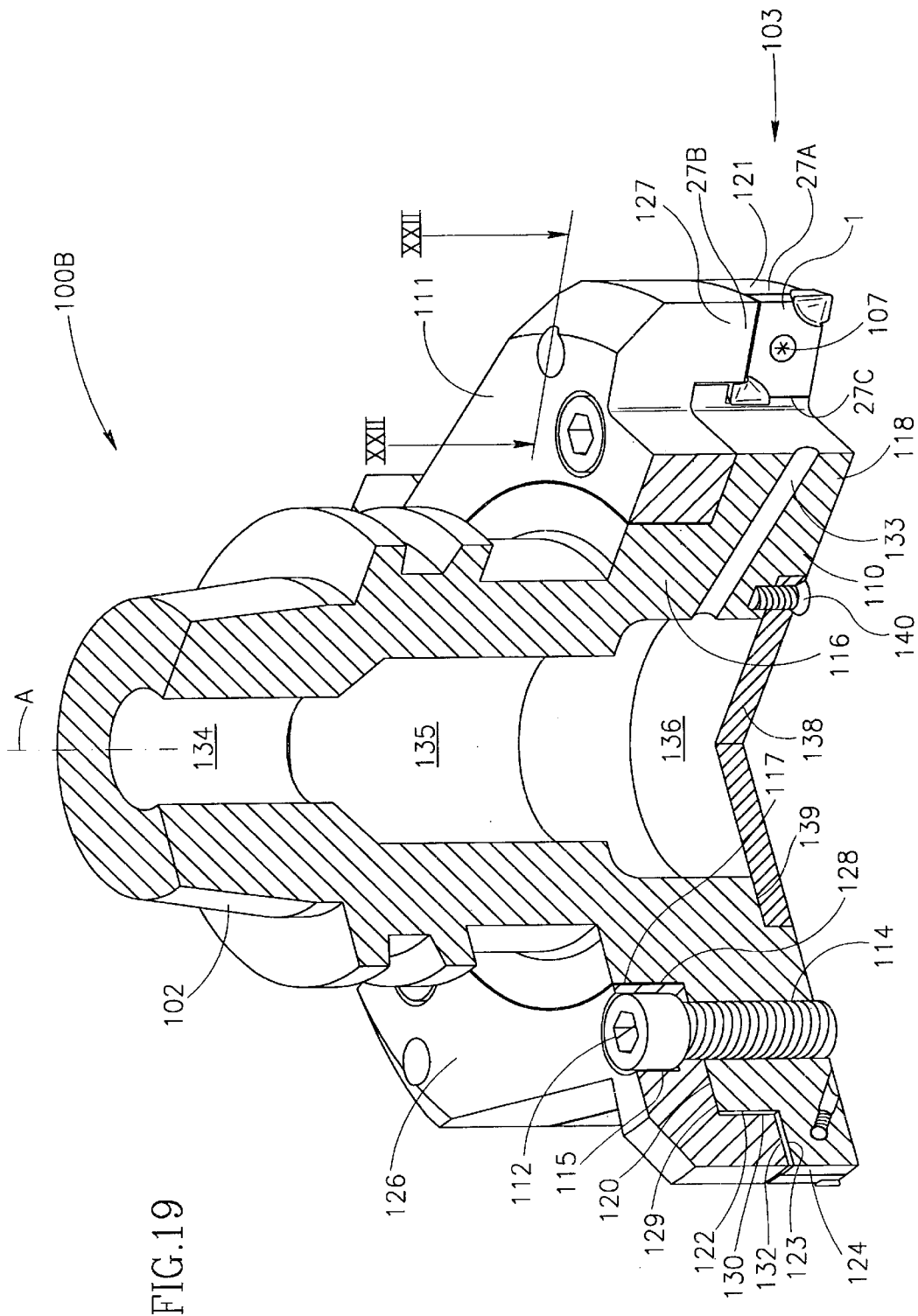
FIG. 19 is a cut-away longitudinal cross sectional view taken along line XIX—XIX shown in FIG. 18.
Figure 20:
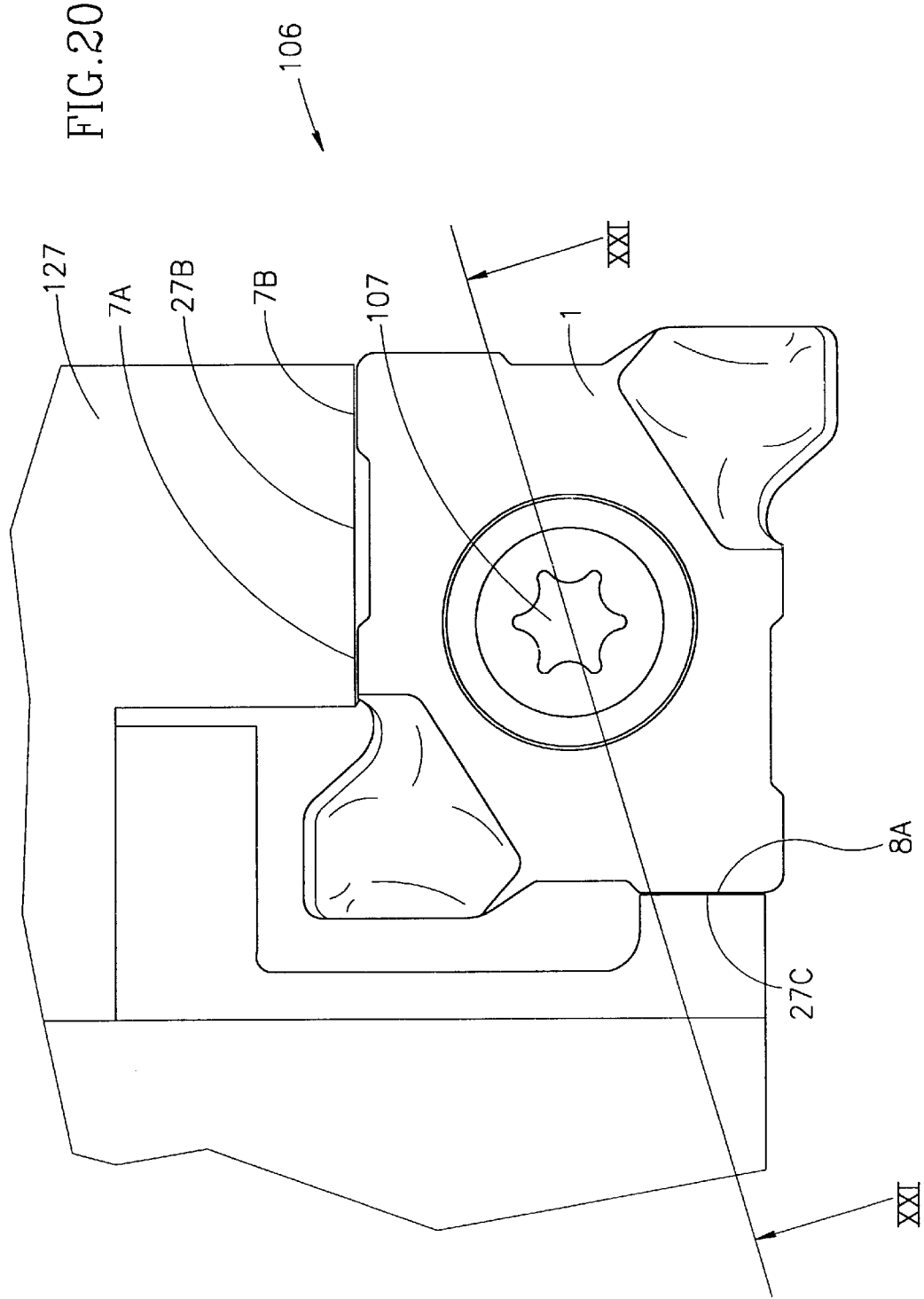
FIG. 20 is a close-up top view of an insert receiving pocket of the milling cutter of FIG. 18.

Against the single body milling toolholder 100A, considerable manufacturing and functional advantages are obtained for a two-piece milling toolholder 100B shown in FIGS. 18 and 19 in which similar parts are likewise numbered. To this end, its cutting head portion 103 comprises a substantially annular main component member 110 formed integrally with and constituting the leading portion of a conical shank portion 102 and a matching substantially annular flange ring 111 for nesting on the trailing side of the main component member 110 and attached thereto by means of coupling screws 112 traversing through corresponding threaded bores 114 and bores 115 (see FIG. 19) in the main component member 110 and the flange ring 111, respectively. In such a two-piece construction, the main component member 110 provides the base support surfaces 27A and radial support surfaces 27C whilst the flange ring 111 provides the axial support surfaces 27B.

As best seen in FIG. 19, the main component member 110 has a stepped cross sectional form with a rear cylindrical portion 116 with an external cylindrical centering surface 117 co-axial with the axis of rotation A and a front cylindrical portion 118 with a highly smooth and planar upper annular surface 120 perpendicular to the axis of rotation A. The front cylindrical portion 118 has radially extending rim portions 121 having a stepped cross sectional form with an upper external cylindrical surface 122, an upper annular surface 123 which is parallel to the upper annular surface 120 and a lower external cylindrical surface 124. As such, each rim portion 121 forms the lower part of a seat structure 104 and provides the base support surfaces 27A and the radial support surfaces 27C.

The flange ring 111 has a matching stepped cross sectional form with an inner portion 126 provided with the through-going bores 115 and radially extending and downward depending rim portions 127. The inner portion 126 has an internal cylindrical surface 128 for mating with the external centering cylindrical surface 117 for centering the flange ring 111 relative to the axis of rotation A and a highly smooth and planar lower annular surface 129 for abutment against the highly smooth and planar upper surface 120 for positioning the lower annular surface 129 perpendicular to the axis of rotation A.

The rim portions 127 constitute the upper parts of the seat structures 104 and are adapted to overhang corresponding rim portions 121 so as to provide the axial support surfaces 27B which are prepared so as to be highly parallel to the lower annular surface 129. As such, the rim portions 127 each have an internal surface 130 and a lower surface 132 which are shaped and dimensioned so as to provide clearance from the radial surface 122 and the upper surface 123 of their corresponding rim portions 121, the clearance thereby ensuring that the centering of the flange ring 121 relative to the axis of rotation A and the positioning of the axial support surfaces 27B parallel to the upper planar surface 120 are not disturbed.

The conical shank portion 102 and the cutting head portion 103 are generally tubular so as to provide for flow communication with a source of coolant media, be it pressurized coolant fluid or compressed air, to flow ducts 133 for cooling the cutting inserts 1 and for rapidly evacuating chips formed during a milling operation. Each seat structure 104 has a dedicated flow duct 133 for providing a flow of coolant media slightly forward of its receiving pocket 106, the flow communication with the source of coolant media being via a bore 134, an intermediate cavity 135 and a lower coolant plenum 136 sealed by a sealing cover 138 inserted into a recess 139 formed in the lower surface of the main component member 110 and attached thereto by a number of screws 140.

The diameter of the lower coolant plenum 136 is relatively large and the flow ducts 133 are in substantial radial alignment with the axis of rotation A such that rotation of the milling cutter 100B urges the cooling media outward at an increased jet velocity for effective chip disposal and heat removal by taking advantage of the centrifugal force imparted thereto. A further advantage of such an arrangement is that the overall mass of the milling cutter 100B is reduced.

Figure 21:
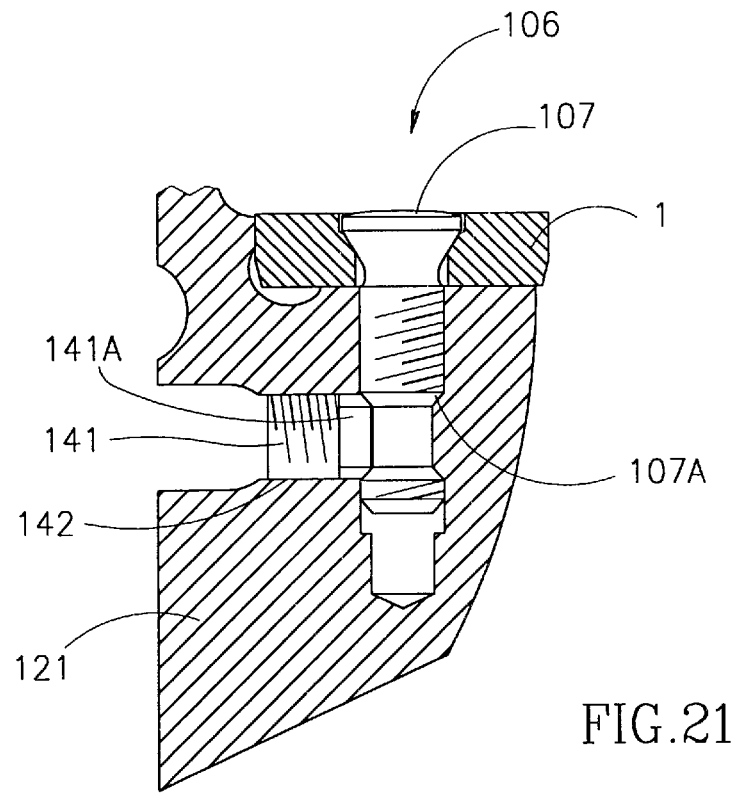
FIG. 21 is a cut-away cross sectional view taken along the line XXI—XXI shown in FIG. 20 illustrating the manner in which a locking screw for retaining a cutting insert in an insert receiving pocket is secured.

As best seen in FIG. 21, each locking screw 107 has an unthreaded central portion 107A against which a dog point end 141A of a securing screw 141 threadingly displaceable along a threaded bore 142 bears against so as to secure the locking screw 107 inserted into a tangentially extending bore of the main component member's rim 121. The tapped bores 142 are in substantial radial alignment with the axis of rotation A such that rotation of the milling cutter 100B urges the securing screws radially outward for effectively securing the locking screws 107 at a biasing force which increases with rotational speed, thereby satisfying the stringent safety demands required at high speed machining.

Figure 22:
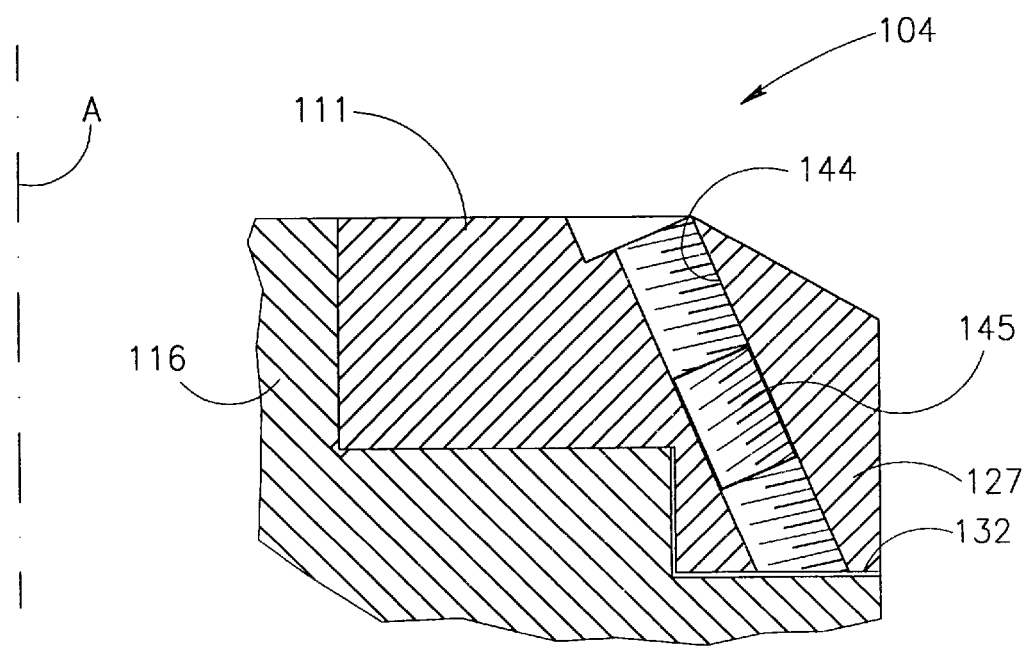
FIG. 22 is a cut-away cross sectional view taken along the line XXII—XXII shown in FIG. 19 illustrating the means for dynamically balancing the milling cutter.

As best seen in FIG. 22, each seat structure 104 is provided with a threaded bore 144 extending from the upper surface of the flange ring 111 through to the lower surface 132 of its associated rim portion 127 at an inclined attitude relative to the axis of rotation A along which a mass balancing screw 145 is threadingly displaceable therealong for facilitating the dynamic balancing of the milling cutter 100B through their individual adjustment.

Figure 23:
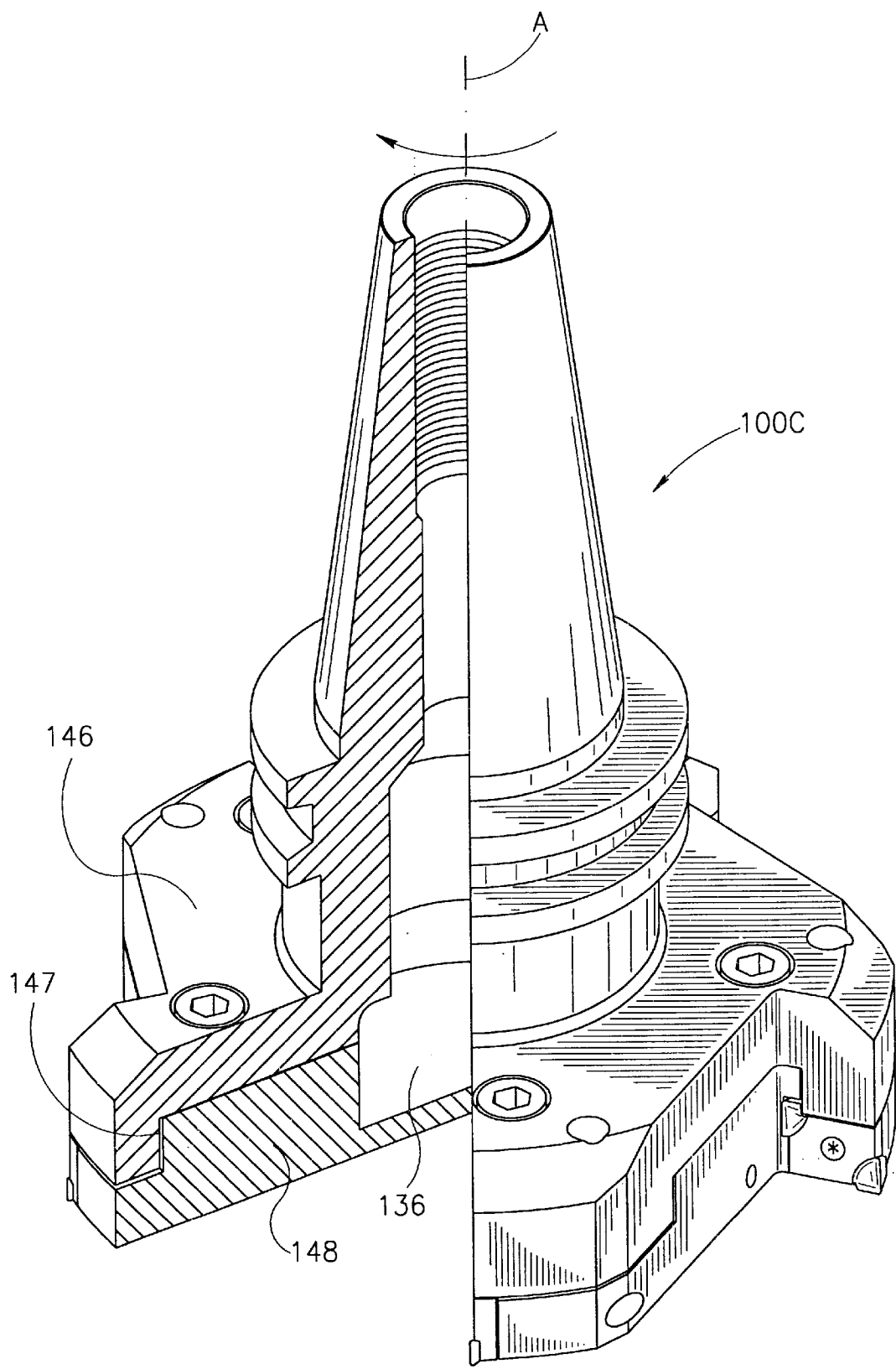
FIG. 23 is a cut-away longitudinal cross sectional view of an alternative two-piece milling cutter with cutting inserts of FIG. 1.

Turning now briefly to FIG. 23, an alternative two-piece milling toolholder 100C is designed such that its cutting head portion 103 comprises a main component member 146 having a recess 147 in its lower surface in which a disc member 148 resides such that the main component member 146 provides the axial support surfaces 27B and the disc member 148 provides the base support surfaces 27A and the radial support surfaces 27C. In the milling cutter 100C, the disc member 148 also acts as the sealing cover 138 of the lower coolant plenum 136.

While the invention has been described with respect to a limited number of embodiments, it will be appreciated that many variations, modifications and other applications of the invention can be made. For example, in the case that the abutment surfaces of a milling cutting insert are inclined with respect to its lower surface, such a modification requires suitable adaptation of the inserts receiving pockets.

We claim:

1. A milling cutter having an axis of rotation and comprising, in combination, a milling toolholder and one or more generally rectangular shaped cutting inserts each having a front cutting edge outwardly protruding from an associated side surface along a lone side thereof for acting as a wiper disposed on a radial perpendicular to the axis of rotation, the milling toolholder being formed with one or more insert receiving pockets each having a planar base support surface parallel to the axis of rotation for tangentially supporting an insert seated therein, an axial support surface for axially supporting said insert at two spaced apart axial contact regions and a radial support surface for radially supporting said insert at a single radial contact region, said axial contact regions defining an imaginary line perpendicular to the axis of rotation in a top view of an insert seated in said insert receiving pocket, said imaginary line also being parallel to said front cutting edge.

2. A milling cutter according to claim 1, wherein a first axial contact region is opposite said front cutting edge and a second axial contact region is remote therefrom.

3. A milling cutter according to claim 1 wherein said axial support surface is planar and perpendicular to said base support surface and said cutting insert has a protruding nose-like cutting corner including said front cutting edge and a side cutting edge outwardly protruding from a short side surface adjacent said long side surface, said front and side cutting edges being elevated relative to an upper surface of said cutting insert with at least said side cutting edge sloping towards said base support surface.

4. A milling cutting insert comprising:
- a substantially prismatic body portion having an upper surface, a lower surface and two pairs of adjacent long and short side surfaces;
- a planar abutment surface formed along said long side surface of a first of said pairs of side surfaces and an abutment surface formed along said short thereof; and
- a cutting corner defined between the side surface of a second of said pairs of adjacent side surfaces and having a front cutting edge associated with said long surface thereof,
- said front cutting edge of the cutting corner outwardly protruding further than the remaining portion of said long surface in a top view of the insert, said front cutting edge also being parallel to said planar abutment surface.

5. An insert according to claim 4 wherein said planar abutment surface is perpendicular to said lower surface.

6. An insert according to claim 4 wherein said planar abutment surface comprises a pair of spaced apart co-planar abutment surface portions.

7. An insert according to claim 6 wherein one of said pair of spaced apart co-planar abutment surfaces is opposite said front cutting edge and the other is remote therefrom.

8. An insert according to claim 4 wherein said cutting corner is a protruding nose-like cutting portion comprising said front cutting edge and a side cutting edge outwardly protruding from a short side surface, said front and side cutting edges being elevated relative to said upper surface with at least said side cutting edge sloping towards said lower surface.

9. A milling toolholder having an axis of rotation and formed with a plurality of peripherally disposed insert receiving pockets each having a rectangular base support surface having a long dimension substantially perpendicular to said axis of rotation and a short dimension substantially parallel to said axis of rotation, a radial support surface and an axial support surface for respectively tangentially, radially and axially supporting an insert seated therein;
- the milling toolholder comprising a main component member providing said base support surfaces and said radial support surfaces with each base support surface and associated radial support surface being formed from a unitary portion of said main component member, and a substantially annular flange ring adapted for nesting on said main component member, said flange ring having lower surfaces circumferentially overhanging complementary surfaces of said main component member at said base support surfaces, circumferentially overhanging portions of said lower surfaces being substantially perpendicular to said axis of rotation and thereby providing said axis support surfaces.

10. A milling toolholder according to claim 9 wherein said radial support surface is planar and perpendicular to said base support surface.

11. A milling toolholder according to claim 9, wherein each insert receiving pocket is associated with a substantially tangentially extending bore formed in said base support surface for receiving a locking screw and a substantially radially extending threaded bore adapted for receiving a securing screw threadingly displaceable therealong for bearing against said locking screw for securing the same.

12. A milling toolholder according to claim 9, wherein each insert receiving pocket is provided with a substantially extending bore formed in said base support surface for receiving a locking screw.

13. A milling toolholder having an axis of rotation and formed with a plurality of peripherally disposed insert receiving pockets each having a base support surface, a radial support surface and an axial support surface for respectively tangentially, radially and axially supporting an insert seated therein;
- the milling toolholder comprising a main component member providing said base support surface and said radial support surfaces and a substantially annular flange ring adapter for nesting on said main component member and thereby providing said axial support surfaces,
- characterized in said axial support surfaces being substantially flat, co-planar surfaces perpendicular to said axis of rotation; and
- wherein each insert receiving pocket is associated with a threaded bore extending at an inclined attitude relative to the axis of rotation, said threaded bore adapted for receiving a mass balancing screw threadingly displaced therealong for dynamic balancing.

* * * * *